United States Patent

Koishi

(10) Patent No.: US 8,238,701 B2
(45) Date of Patent: Aug. 7, 2012

(54) OPTICAL CONNECTOR

(75) Inventor: Musubu Koishi, Hamamatsu (JP)

(73) Assignee: Precise Gauges Co., Ltd., Shizuoka (JP)

( * ) Notice: Subject to any disclaimer, the term of this patent is extended or adjusted under 35 U.S.C. 154(b) by 306 days.

(21) Appl. No.: 12/593,686

(22) PCT Filed: Mar. 30, 2007

(86) PCT No.: PCT/JP2007/057687
§ 371 (c)(1),
(2), (4) Date: Sep. 29, 2009

(87) PCT Pub. No.: WO2008/129604
PCT Pub. Date: Oct. 30, 2008

(65) Prior Publication Data
US 2010/0046888 A1  Feb. 25, 2010

(51) Int. Cl.
*G02B 6/32* (2006.01)
(52) U.S. Cl. ............... 385/33; 385/51; 385/52; 385/91; 385/88; 385/90; 385/96; 250/214; 250/214 C
(58) Field of Classification Search .................. 385/33, 385/51, 52, 91, 88, 90, 96; 250/214.1, 214 C
See application file for complete search history.

(56) References Cited

U.S. PATENT DOCUMENTS

| | | | | |
|---|---|---|---|---|
| 5,659,645 A | * | 8/1997 | Satake | 385/33 |
| 2006/0140537 A1 | * | 6/2006 | Koishi | 385/33 |

FOREIGN PATENT DOCUMENTS

| JP | 1-217407 | 8/1989 |
|---|---|---|
| JP | 2006-209085 | 8/2006 |

OTHER PUBLICATIONS

International Search Report dated May 1, 2007 for International Application No. PCT/JP2007/057687.

* cited by examiner

*Primary Examiner* — Jack Berman
*Assistant Examiner* — Meenakshi Sahu
(74) *Attorney, Agent, or Firm* — Wenderoth, Lind & Ponack, L.L.P.

(57) ABSTRACT

An optical connector comprises a sleeve with a flange provided at one end face of a hollow cylinder, a collimator lens, which is press-fitted into or fitted by insertion into the sleeve to be thereafter adhered and fixed to the sleeve, and an optical fiber, which is fusion-bonded at the end face of the collimator lens on the opposite side to the flange side in such a state that the collimator lens is fixed into the sleeve, wherein the end face of the flange is machined to a plane perpendicular to an optical axis, and the collimator lens has a focal position at the end face on the opposite side to the flange side.

17 Claims, 3 Drawing Sheets

Example of split sleeve

Example of split sleeve

OPTICAL CONNECTOR

BACKGROUND OF THE INVENTION (1) Field of the Invention

This invention relates to an optical connector with a fusion-bonded optical fiber.

(2) Description of Related Art

In the prior art, when light is transmitted by an optical fiber, as shown in FIG. 1A, there has been used a component provided by inserting an optical fiber 2 into a ferrule 1, which has a hole in its center, to fix the optical fiber 2 with an adhesive, cutting the front end of the optical fiber 2, and polishing an end face 3 along with the optical fiber 2. When an optical connector is configured by using this component, as shown in FIG. 1B, the two components facing each other are inserted into a sleeve 4, the left and right ferrules 1 are aligned with high accuracy in a direction along an optical axis. Then, pressure is applied to the ferrules 1 by left and right screw components 5A and 5B and springs 6 so that the front ends of the optical fibers 2 are slightly deformed. Therefore, high-efficiency optical coupling is realized. The sleeve 4 is preferably a split sleeve with a precut hollow cylinder (see, FIG. 1C).

However, the optical connector using the prior art component has the following problems:

(1) the front ends of the ferrules are in contact with each other while subjected to pressure from the springs 6 as shown in FIG. 1B, and therefore, the core end face of the optical fiber is easily damaged. Especially, when the connection is repeated, deterioration cannot be avoided;

(2) a portion through which light passes is several μmφ, and therefore, when dust is adhered on the contact surface in a case where the optical connector is connected in a normal environment, or where deviation in a vertical direction occurs when the ferrule end faces are in contact with each other, the coupling efficiency may be deteriorated; and (3) since an assembly operation for inserting the optical fiber 2 into the ferrule 1 requires polishing and machining of the end face 3 of the ferrule 1, the assembly operation is difficult to perform on site.

BRIEF SUMMARY OF THE INVENTION

Problems to be Solved by the Invention

The present invention has been made in order to solve the above problems of the conventional optical connector, and therefore has an object to provide an optical connector, which is free from deterioration even if connected or disconnected more than one time, does not notably affect the coupling efficiency even if small dust adheres thereto, and, at the same time, can be easily assembled on site.

Means for Solving the Problems

The present invention relates to an optical connector with a fusion-bonded optical fiber, and the above object of the present invention is achieved by the optical connector, which is characterized by including a sleeve with a flange provided at one end face of a hollow cylinder, a collimator lens which is press-fitted into or fitted by insertion into the sleeve to be thereafter adhered and fixed to the sleeve, and an optical fiber which is fusion-bonded by discharging (or heating by infrared laser or heating by microflame) at the end face of the collimator lens on the opposite side to the flange side in such a state that the collimator lens is fixed into the sleeve, wherein the end face of the flange is machined to a plane vertical to an optical axis, and the collimator lens has a focal position at the end face on the opposite side to the flange side.

The optical fiber is fusion-bonded at the focal position of the collimator lens, whereby the above object of the present invention is effectively achieved.

DETAILED DESCRIPTION OF THE INVENTION

A preferred embodiment of an optical connector according to this invention will be described with reference to the drawings.

Figure 1:
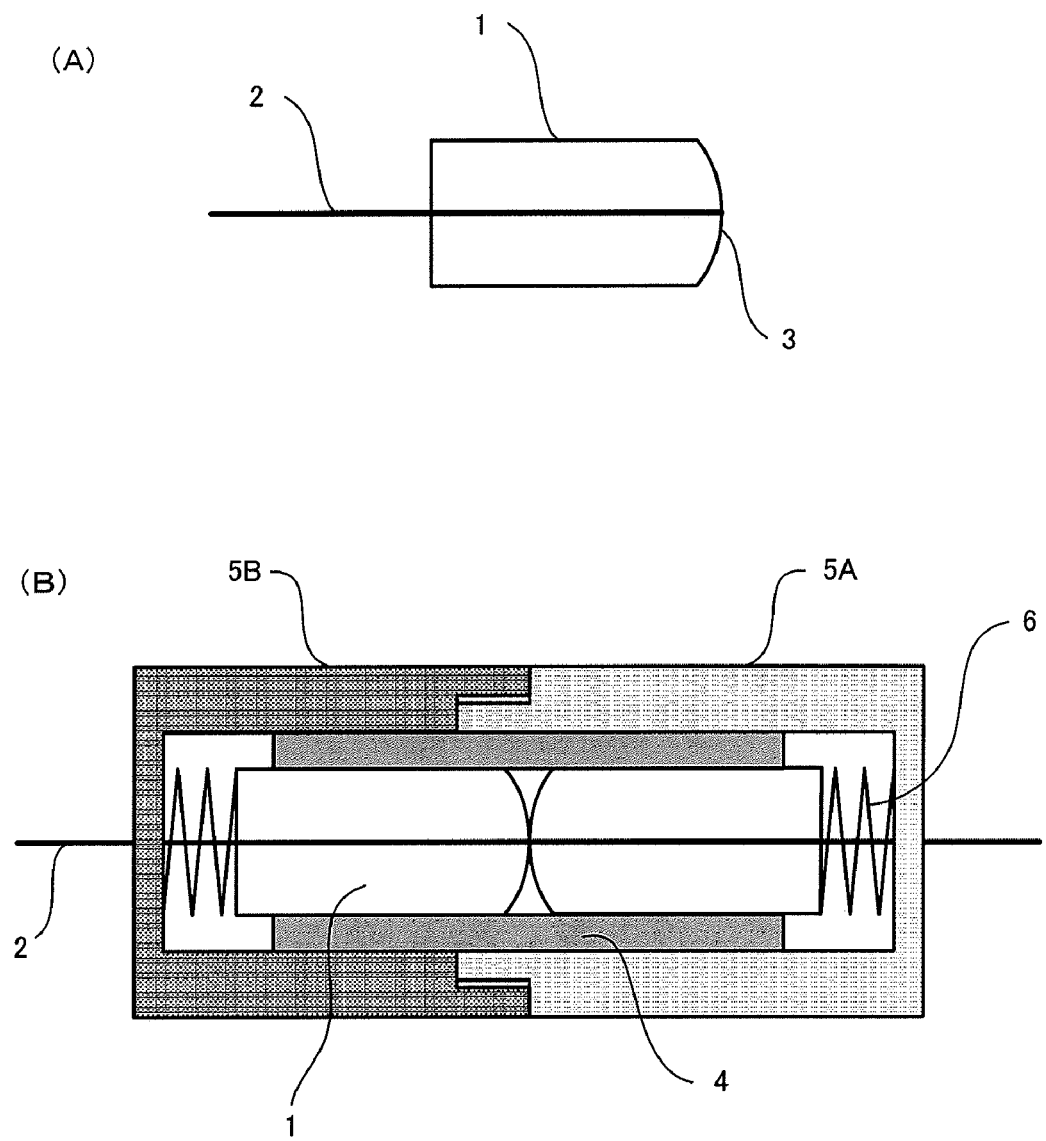
FIG. 1 is a view showing a conventional optical connector.
Figure 2:
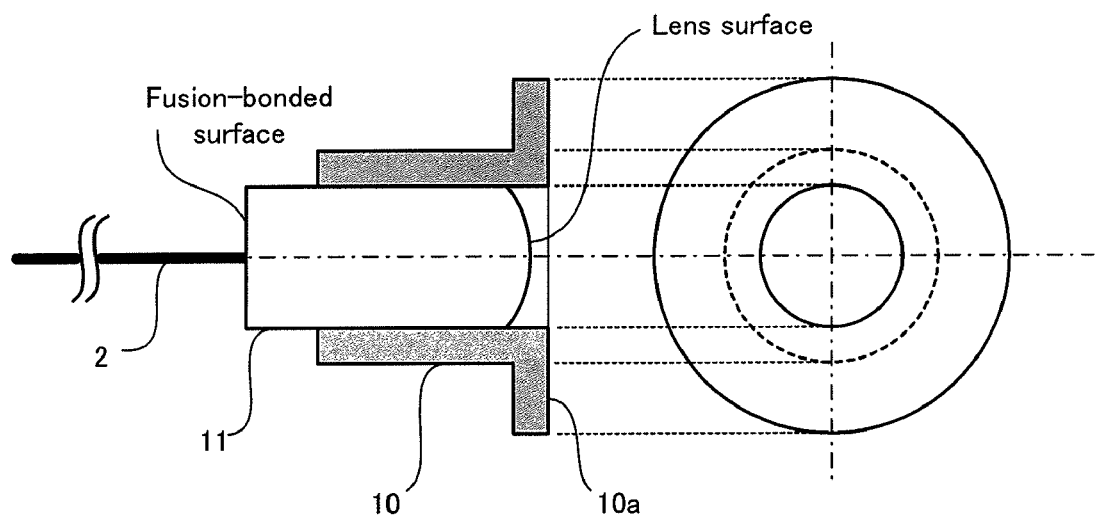
FIG. 2 is a view showing a shape of an optical connector according to this invention.

FIG. 2 is a view showing a shape of the optical connector according to this invention. In FIG. 2, the right side is a front view of the optical connector, and the left side is the side view thereof. A sleeve 10 has a flange part 10a provided at one end of a hollow cylinder. The end face of the flange 10a is polished and plane-machined in a direction accurately perpendicular to an optical axis. The sleeve 10 is preferably made of metal, zirconia, or ceramic. A collimator lens 11 is press-fitted into or fitted by insertion into the sleeve 10 to be thereafter adhered by, for example, an adhesive, and, thus, to be fixed to the sleeve 10. The optical fiber 2 is fusion-bonded by discharging at the end face (fusion-bonded surface) of the collimator lens 11 on the opposite side to the lens surface of the collimator lens 11.

The lens surface of the collimator lens 11 is located slightly more inward than the end face of the flange part 10a. This is because when the two optical connectors face each other, their beam waist positions are matched to each other so as to optimize the light collection efficiency, and, at the same time, the lens surfaces are free from contact with each other.

The optical fiber is fusion-bonded at the focal position of the collimator lens 11. The light from the optical fiber 2 that enters the focal position of the collimator lens 11 becomes parallel light and then is emitted from the lens surface of the collimator lens 11; meanwhile, the light entering on the lens surface in parallel with the optical axis of the collimator lens 11 is collected at the focal position. According to such properties, the optical fiber 2 is fusion-bonded at the focal position, whereby the return ratio (coupling efficiency) of the reflected light to the emitted light becomes maximum.

In a further preferred embodiment, an anti-reflection film is formed on the lens surface by, for example, vapor deposition. According to this constitution, the coupling efficiency can be within about 0.3 dB, and a performance equal to that of the conventional optical connector can be obtained.

As described above, in the optical connector according to this invention, the optical fiber 2 is fusion-bonded by discharging at the focal position of the collimator lens 11. However, since the focal position of the collimator lens 11 is individually varied, it cannot be unambiguously determined by a physical position (for example, the center of the collimator lens). Thus, the light from the optical fiber 2 is actually allowed to enter the collimator leans 11, and then, the light emitted from the lens surface is reflected on a plane mirror 12 (FIG. 3) provided vertically to the optical axis (or adhered onto the flange surface). The reflected light is collected by the collimator lens 11 to be introduced into the optical fiber 2. The position where the intensity of the reflected light is maximum is regarded as a focal position, and the optical fiber is fusion-bonded by discharging at the position. Thus, a manufacturing apparatus therefor is required, and the apparatus disclosed in Japanese Patent Application Laid-Open No. 2006-209085 (Patent Document 1) can be utilized.

Figure 3:
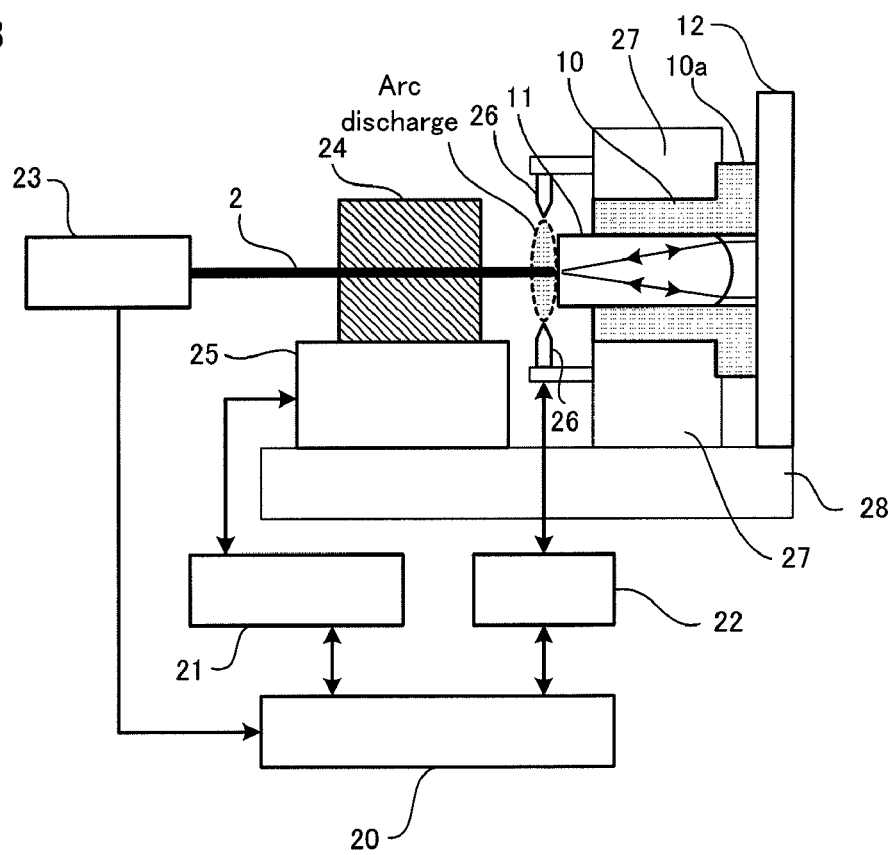
FIG. 3 is a schematic view showing a configuration of a manufacturing apparatus of the optical connector according to this invention.

FIG. 3 is a schematic view showing a configuration of a manufacturing apparatus of the optical connector according to this invention. In the manufacturing apparatus, the optical connector is manufactured by fusion-bonding the optical fiber 2 and the collimator lens 11 by discharging, and the apparatus and the mounting method described in the Patent Document 1 are utilized.

The manufacturing apparatus of the optical connector shown in FIG. 3 has a system control part 20, a stage control part 21, an arc discharge power supply 22, a reflected light detecting part 23, an optical fiber holder 24, a movable stage 25, an arc discharge electrode 26, and a sleeve holder 27.

The system control part 20 controls the entire operation of the manufacturing apparatus of the optical connector shown in FIG. 3, that is, controls the sequential fusion-bonding operation for manufacturing the optical connector. The sleeve holder 27 is a fixture for holding the sleeve 10 fixed with the collimator lens 11 to be processed. A holder 28 holds the plane mirror 12 in cooperation with the sleeve holder 27.

The plane mirror 12 reflects the light emitted from the collimator lens 11 to thereby cause the light to enter the collimator lens 11 again. The plane mirror 12 is fixed by the holder 28 so as to be perpendicular to the axial direction of the sleeve 10. While the plane mirror 12 is floated by, for example, a spring and is pressed against and adhered to the flange end face of the sleeve, whereby the plane mirror 12 can be fixed strictly-perpendicular to the optical axis direction of the sleeve.

The optical fiber holder 24 holds the optical fiber 2 to be bonded to the collimator lens 11. The movable stage 25 is position adjustment means, which moves the optical fiber holder 24 placed on the movable stage 25 to thereby adjust the position of the optical fiber 2 held by the optical fiber holder 24. The movable stage 25 is three-dimensionally driven under the control of the stage control part 21, or the movable stage 25 may be manually operated by an operator. In the present apparatus, although the relative position of the optical fiber 2 to the collimator lens 11 is adjusted by the movement of the optical fiber holder 24, it may be adjusted by the movement of the sleeve holder 27 or movement of both the sleeve holder 27 and the optical fiber holder 24.

The stage control part 21 controls the operation of the movable stage 25 under the control of the system control part 20. The arc discharge electrode 26 includes a pair of positive and negative electrodes. The arc discharge electrode 26 receives power supplied from the arc discharge power supply 22, operated under the control of the system control part 20, to thereby generate an arc discharge. The timing of the generation of an arc discharge and the strength of the discharge are controlled by the system control part 20.

The reflected light detecting part 23 causes a signal light, used in the detection of the focal position of the collimator lens 11, to enter the optical fiber 2, and, at the same time, detects the intensity of the reflected light from the optical fiber 2. The configuration of the reflected light detecting part 23 will be described in detail based on FIG. 4.

Figure 4:
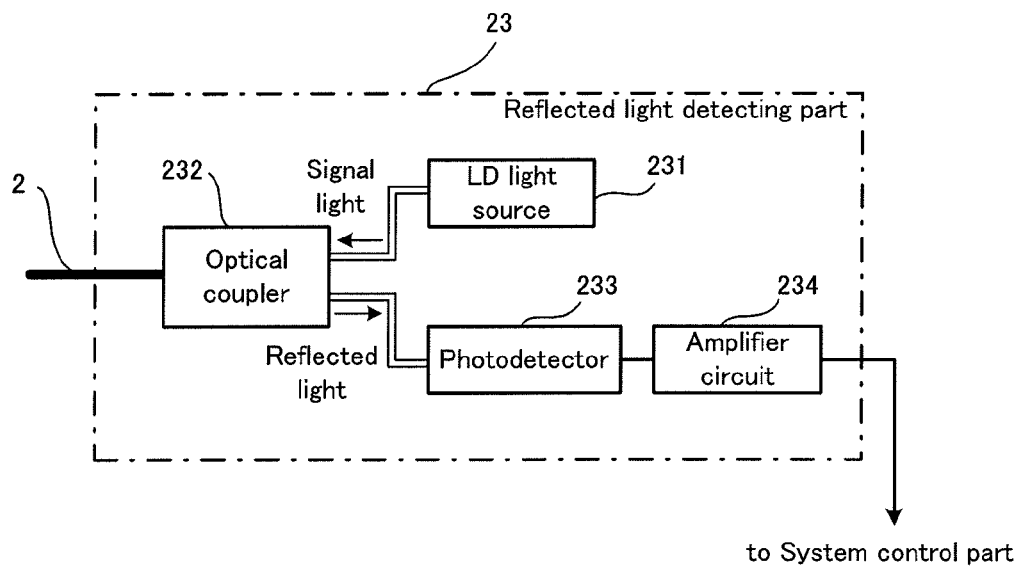
FIG. 4 is a view for explaining a configuration of a reflected light detecting part.

FIG. 4 is a view for explaining a configuration of the reflected light detecting part 23 used when a single-core fiber collimator is fabricated. The reflected light detecting part 23 includes a laser diode (LD) light source 231, an optical coupler 232, a photodetector 233, and an amplifier circuit 234. The light (signal light) emitted from the LD light source 231 passes through the optical coupler 232 to enter one end of the optical fiber 2 and is emitted from the other end of the optical fiber 2 to enter the collimator lens 11. This light is collimated by the collimator lens 11 to be emitted from the collimator lens 11, and, thus, to be reflected by the plane mirror 12. The reflected light then returns to the collimator lens 11 again to enter the optical fiber 2. Further, this light (reflected light) enters the optical coupler 232 through the optical fiber 2 to be guided to the photodetector 233. The photodetector 233 detects the intensity of the reflected light, and the detection signal output from the photodetector 233 is amplified by the amplifier circuit 234 to be output to the system control part 200 (FIG. 3).

The system control part 20 shown in FIG. 3 controls the stage control part 21 to three-dimensionally drive the movable stage 25, based on the detection signal output from the reflected light detecting part 23. According to this constitution, the position of the front end of the optical fiber 2 on the X-axis, Y-axis and Z-axis is determined so that the intensity of the reflected light becomes maximum. According to such focal position detection, a center position of the core at the front end of the optical fiber 2 is determined at the focal position of the collimator lens 11. When the position to which the optical fiber 2 is fusion-bonded is detected, the system control part 20 gives instructions to the arc discharge power supply 22, an arc discharge is generated from the arc discharge electrode 26, and the optical fiber 2 is fusion-bonded at the focal position of the collimator lens 11.

Figure 5:
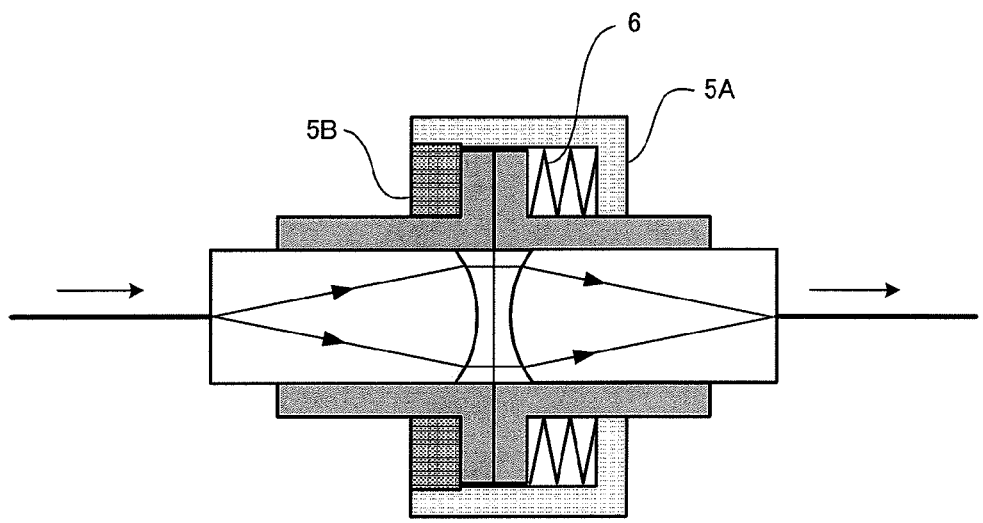
FIG. 5 is a view showing a used state of the optical connector according to this invention.

In FIG. 5, the two optical connectors according to this invention face each other, and flange reference surfaces are a butted against each other by screw components 5A, 5B and springs 6, whereby the optical coupling is realized. In this case, light passing through between the left optical connector and the right optical connector is accurately parallel light, and therefore, even if deviation of about several ten μm occurs in the bonded surface, it hardly affects the coupling efficiency.

The optical connector according to this invention provides the following excellent effects:

(1) there is a space between the two facing optical connectors, and thus, since the connection does not cause the lens surfaces to be in contact with each other, deterioration does not occur even if connection and disconnection are performed more than one time;

(2) by the use of the collimator lens, a collimate beam diameter is increased (in an aspheric lens with a focal length of 1.3 mm, the collimate beam diameter is about 250 μmφ); therefore, even if dust or the like is adhered onto the lens surface, the coupling efficiency is not notably affected;

(3) since the optical fiber is bonded by discharge fusion bonding, the operation can be performed on site, and, at the same time, can be performed in a short time; and (4) according to the preferred embodiment of this invention in which an anti-reflection film is vapor-deposited on the lens surface, the optical coupling efficiency can be within about 0.3 dB, whereby a performance equal to that of the conventional optical connector can be obtained.

The invention claimed is:

1. An optical connector comprising:
a sleeve including a hollow cylinder and a flange provided at one end of the hollow cylinder;

a collimator lens which is fixed to the sleeve by press-fitting or adhesive; and an optical fiber which is fusion-bonded at an end face of the collimator lens on a side of the collimator lens opposite to a flange side of the collimator lens, wherein an end face of the flange is machined to a plane perpendicular to an optical axis, and the collimator lens has a focal position at the end face of the collimator lens on the opposite side to the flange side, and wherein the optical fiber is fusion-bonded at the focal position of the collimator lens while the collimator lens is in a state of being fixed into the sleeve.

2. The optical connector according to claim 1, wherein the optical fiber is fusion-bonded by discharging, heating by infrared laser, or heating by microflame.

3. The optical connector according to claim 1, wherein the end face of the flange is polished and machined.

4. The optical connector according to claim 2, wherein the end face of the flange is polished and machined.

5. The optical connector according to claim 1, wherein an anti-reflection film is provided on a lens surface of the collimator lens.

6. The optical connector according to claim 2, wherein an anti-reflection film is provided on a lens surface of the collimator lens.

7. The optical connector according to claim 3, wherein an anti-reflection film is provided on a lens surface of the collimator lens.

8. The optical connector according to claim 4, wherein an anti-reflection film is provided on a lens surface of the collimator lens.

9. The optical connector according to claim 1, wherein the sleeve is made of metal, zirconia, or ceramic.

10. A system of connected optical fibers, the system comprising:

a first optical connector according to claim 1;

a second optical connector according to claim 1; and connecting components for holding the first optical connector and the second optical connector together with the end face of the flange of the first optical connector abutting against the end face of the flange of the second optical connector.

11. The system of claim 10, wherein the first optical connector is connected to the second optical connector with the end face of the flange of the first optical connector abutting against the end face of the flange of the second optical connector, and the collimator lens of the first optical connector is arranged with an end face on the flange side spaced apart from the collimator lens of the second optical connector.

12. The system of claim 10, wherein each optical fiber is fusion-bonded by discharging, heating by infrared laser, or heating by microflame.

13. The system of claim 10, wherein the end face of each flange is polished and machined.

14. The system of claim 10, wherein an anti-reflection film is provided on a lens surface of each collimator lens.

15. The system of claim 10, wherein each sleeve is made of metal, zirconia, or ceramic.

16. The optical connector according to claim 1, wherein the collimator lens contacts an inner peripheral surface of the sleeve.

17. The optical connector according to claim 1, the collimator lens is connected to an inner peripheral surface of the sleeve with an adhesive.

* * * * *